(12) United States Patent
Kertesz et al.

(10) Patent No.: US 9,103,479 B2
(45) Date of Patent: Aug. 11, 2015

(54) CONNECTING DEVICE FOR THE CONNECTION OF A PIPE SOCKET AND A HOSE

(75) Inventors: Janos Kertesz, Hofheim (DE); Gunter Röder, Hann. Münden (DE); Gerhard Wachter, Büdingen (DE)

(73) Assignee: NORMA GERMANY GMBH, Maintal (DE)

( * ) Notice: Subject to any disclaimer, the term of this patent is extended or adjusted under 35 U.S.C. 154(b) by 1071 days.

(21) Appl. No.: 11/724,036

(22) Filed: Mar. 13, 2007

(65) Prior Publication Data

US 2007/0216158 A1    Sep. 20, 2007

(30) Foreign Application Priority Data

Mar. 14, 2006   (DE) .................... 10 2006 011 617

(51) Int. Cl.
  *F16L 33/00*    (2006.01)
  *F16L 33/22*    (2006.01)
  *F16L 33/28*    (2006.01)

(52) U.S. Cl.
  CPC ........ *F16L 33/22* (2013.01); *F16L 33/28* (2013.01)

(58) Field of Classification Search
  USPC ............. 285/242, 259, 244, 305, 307, 308, 285/256–258, 241, 252, 248, 319, 253, 254, 285/239, 238
  See application file for complete search history.

(56) References Cited

U.S. PATENT DOCUMENTS

| | | | | |
|---|---|---|---|---|
| 1,101,844 A * | 6/1914 | Gething | .................. | 285/114 |
| 1,965,426 A * | 7/1934 | Nelson | .................. | 285/257 |
| 2,121,624 A * | 6/1938 | Cowles | .................. | 285/256 |
| 2,535,460 A * | 12/1950 | Rotter et al. | .............. | 285/222.4 |
| 2,749,150 A | 6/1956 | Kaiser | | |
| 2,765,183 A * | 10/1956 | Mahoney | ............... | 285/87 |
| 3,140,884 A * | 7/1964 | Brauck | .................. | 285/242 |
| 3,174,777 A * | 3/1965 | Evans et al. | ............. | 285/252 |
| 3,466,067 A * | 9/1969 | Orain | ..................... | 285/244 |
| 3,589,752 A * | 6/1971 | Spencer et al. | ........... | 285/257 |
| 4,135,744 A * | 1/1979 | Fouts | ..................... | 285/253 |
| 4,185,472 A * | 1/1980 | Yates et al. | ............. | 464/181 |
| 4,451,070 A * | 5/1984 | Sauer | ..................... | 285/242 |
| 4,486,034 A * | 12/1984 | Sauer | ..................... | 285/242 |
| 4,556,241 A * | 12/1985 | Weinhold | ............... | 285/244 |
| 4,592,575 A * | 6/1986 | Hughes et al. | ............ | 285/252 |
| 4,607,867 A * | 8/1986 | Jansen | ................... | 285/242 |
| 4,664,424 A * | 5/1987 | Smith | ..................... | 285/256 |
| 4,687,234 A * | 8/1987 | Weinhold | ............... | 285/244 |
| 4,708,375 A * | 11/1987 | Sauer | ..................... | 285/258 |
| 4,750,525 A * | 6/1988 | Vaughan | ................. | 138/89 |
| 4,775,172 A * | 10/1988 | Sauer | ................... | 285/148.14 |
| 4,775,173 A * | 10/1988 | Sauer | ................... | 285/148.14 |

(Continued)

FOREIGN PATENT DOCUMENTS

| | | |
|---|---|---|
| DE | 1 992 816 | 8/1968 |
| DE | 79 20 195 | 11/1979 |

(Continued)

*Primary Examiner* — Aaron Dunwoody (74) *Attorney, Agent, or Firm* — Lucas & Mercanti, LLP; Klaus P. Stoffel (57) ABSTRACT

A connecting device with a pipe socket and a hose made of rubber-like material. The pipe socket and the hose abut in a sealing zone which is encased over at least a part of its length by a hose reinforcement which forms part of a geometric fastening configuration with which the pipe socket and the hose are held together.

16 Claims, 10 Drawing Sheets

(56) References Cited

U.S. PATENT DOCUMENTS

| | | | | |
|---|---|---|---|---|
| 4,872,711 A * | 10/1989 | Weinhold | | 285/88 |
| 4,993,756 A * | 2/1991 | Bechu | | 285/319 |
| 5,040,829 A * | 8/1991 | Sauer | | 285/256 |
| 5,054,821 A * | 10/1991 | Hillstead | | 285/321 |
| 5,094,493 A * | 3/1992 | Sauer | | 285/256 |
| 5,209,527 A * | 5/1993 | Hohmann et al. | | 285/242 |
| 5,273,323 A * | 12/1993 | Calmettes et al. | | 285/321 |
| 5,314,210 A * | 5/1994 | Calmettes et al. | | 285/93 |
| 5,536,047 A * | 7/1996 | Detable et al. | | 285/39 |
| 5,568,944 A * | 10/1996 | Kawasaki | | 285/21.1 |
| 5,620,209 A * | 4/1997 | Sauer | | 285/23 |
| 5,871,240 A * | 2/1999 | Miyajima et al. | | 285/226 |
| 5,875,820 A * | 3/1999 | Braun | | 138/109 |
| 5,882,048 A * | 3/1999 | Kawasaki et al. | | 285/319 |
| 6,050,608 A * | 4/2000 | Hattori et al. | | 285/39 |
| 6,082,783 A * | 7/2000 | Kawasaki et al. | | 285/321 |
| 6,523,862 B1 * | 2/2003 | MacDuff | | 285/256 |
| 6,607,218 B2 * | 8/2003 | Sakazaki et al. | | 285/226 |
| 6,712,098 B2 * | 3/2004 | Sakazaki et al. | | 138/109 |
| 7,014,216 B2 * | 3/2006 | Mittersteiner et al. | | 285/247 |
| 7,029,035 B2 * | 4/2006 | Seymour et al. | | 285/308 |
| 7,090,255 B2 * | 8/2006 | Clarke et al. | | 285/23 |
| 7,108,292 B2 * | 9/2006 | Lipscomb et al. | | 285/272 |
| 7,267,373 B2 * | 9/2007 | Sakazaki et al. | | 285/253 |
| 7,341,284 B2 * | 3/2008 | Mittersteiner et al. | | 285/247 |
| 7,370,889 B2 * | 5/2008 | Maunder et al. | | 285/242 |
| 7,390,028 B2 * | 6/2008 | Blazek | | 285/317 |
| 7,464,968 B2 * | 12/2008 | Sakazaki et al. | | 285/242 |
| 7,562,910 B2 * | 7/2009 | Kertesz et al. | | 285/256 |
| 7,661,721 B2 * | 2/2010 | Mittersteiner et al. | | 285/243 |
| 7,971,911 B2 * | 7/2011 | Kertesz et al. | | 285/305 |
| 2002/0000721 A1 * | 1/2002 | Ohya | | 285/322 |
| 2002/0101078 A1 * | 8/2002 | Robinson | | 285/305 |
| 2004/0032124 A1 * | 2/2004 | Lefere et al. | | 285/242 |
| 2004/0195831 A1 * | 10/2004 | Ohya | | 285/242 |
| 2004/0232696 A1 * | 11/2004 | Andre | | 285/319 |
| 2005/0012332 A1 * | 1/2005 | Werth | | 285/322 |
| 2005/0189765 A1 * | 9/2005 | Maunder et al. | | 285/305 |
| 2006/0232063 A1 * | 10/2006 | Steingass et al. | | 285/242 |
| 2008/0284163 A1 * | 11/2008 | Proulx et al. | | 285/243 |
| 2009/0256354 A1 * | 10/2009 | Ullrich et al. | | 285/308 |
| 2009/0302600 A1 * | 12/2009 | Blivet et al. | | 285/307 |

FOREIGN PATENT DOCUMENTS

| | | |
|---|---|---|
| DE | 34 24 675 | 1/1986 |
| DE | 93 00 414 | 3/1993 |
| DE | 195 48 188 | 6/1997 |
| DE | 196 22 099 | 12/1997 |
| EP | 1 561 987 | 8/2005 |
| GB | 2 259 342 | 3/1993 |
| JP | 2001-141155 | 5/2001 |
| WO | 2004/001272 | 12/2003 |

* cited by examiner

CONNECTING DEVICE FOR THE CONNECTION OF A PIPE SOCKET AND A HOSE

BACKGROUND OF THE INVENTION

1. Field of the Invention

The present invention relates to a connecting device with a pipe socket and a hose of rubber-like material.

2. Description of the Related Art

Frequently fluids, like liquids and gases, are guided through hoses that are made of a rubber-like material. Such hoses show a relatively high flexibility. However, it requires a certain effort to connect them to a pipe socket.

For the connection of a hose with a pipe socket the hose end is therefore customarily provided with a coupling element. The coupling element is provided with a tubular connection extension, onto which the hose end is pushed and fastened with the appropriate clamping means, for example, a pipe clip or an annular spring. The coupling piece can then be connected to the pipe socket.

However, this type of connection is relatively time-consuming, because it requires several mounting steps. Furthermore, there are at least two areas where a reliable sealing action must be guaranteed, i.e., on the one hand, at the connection between the hose and the coupling piece and, on the other hand, at the connection between the coupling piece and the pipe socket.

SUMMARY OF THE INVENTION

Therefore, it is the primary object of the present invention to provide an easy connecting procedure between the pipe socket and the hose.

In a connecting device of the above-described type, this object is solved in that the pipe socket and the hose adjoin in a sealing zone which is, at least over a part of its length, encased by a tube reinforcement which provides a part of a fastening geometry with which the pipe socket and the hose are held together.

In such an embodiment of the connecting arrangement, the hose itself is used as a sealing element so that additional sealing means are unnecessary. This is arranged in a simple manner because the hose is made of rubber-like material. The rubber-like material can be natural rubber as well as synthetic rubber (EPDM, NBR, HNBR, silicone, MVQ, fluoro elastomer like FKM), or other elastomers, in particular, thermoplastic elastomers like TPE-O, TPE-V and TEEE. Such materials are often already used for the production of seals. The hose itself, however, is not stable enough to guarantee the sealing in the sealing area. Therefore, the hose reinforcement is provided which prevents an elastic expansion of the hose in such a way that the hose remains in sealing contact with the pipe socket. Simultaneously, the hose reinforcement is used as a means to create a mechanical attachment between the hose and the pipe socket, particularly through positive locking. The mechanical connection between the pipe socket and the hose serves mainly to absorb tensile forces which could pull the hose from the pipe socket. This embodiment has the advantage that the mechanical connection between the pipe socket and the hose can be arranged immediately adjacent to the sealing area, which again has a positive effect on the tightness and the durability of the connection between the pipe socket and the hose. The connecting arrangement has the great advantage that it can be designed as a plug-in-type solution so that there is no need for either a press sleeve or a hose clamp. Rather, the connection can be established through a simple movement in which the pipe socket is inserted into the hose. Generally, an additional seal, for example, an O-ring is not necessary.

Preferably, the hose reinforcement has a greater deformation resistance than the hose. Thus it is guaranteed that the hose is kept on the pipe socket by the hose reinforcement, including when pressures on the inside of the hose develop which, without the hose reinforcement, could possibly lead to a disengagement of the hose from the pipe socket.

Preferably, the hose reinforcement comprises a heat extension coefficient that is in the area of 60% to 150% of the heat extension coefficient of the pipe socket. Frequently, during temperature changes the external dimension of the pipe socket also changes. For example, it rises at higher temperatures. If the temperature-dependent enlargement of the hose reinforcement behaves similar to the temperature-dependent dimensional change of the pipe socket, excessive tensions in the part of the hose located between the hose reinforcement and the pipe socket are kept small or can even be avoided entirely.

Preferably, the hose reinforcement is connected in a form-fitting manner with the hose. This has two advantages. On the one hand, the hose reinforcement is kept reliably at the hose, even when the hose is not yet slid onto the pipe socket. On the other hand, through the connection between the hose and the hose reinforcement the mechanical connection between the hose and the pipe socket is further improved, if a fastening means cooperates with the fastening geometry at the hose reinforcement.

Herein it is particularly preferred, that the hose reinforcement in the area of the sealing zone engages in a recess on the circumference of the hose. This embodiment has, aside from the formation of a form-fitting connection between the hose reinforcement and the hose, the advantage that the hose is pressed in the recess area when the pipe socket is pushed in. In this area, the wall thickness of the hose is smaller so that the expansion of the hose causes here a stronger compression of the hose material than in axial direction outside the recess. Through this pressing of the hose it is no longer possible to remove the hose from the pipe socket.

As an alternative, or additionally, the hose reinforcement can be connected immediately adhering to the hose. An immediately adhering connection is often also called a "materially conclusive connection" or "adherence modified connection". Generally, such a connection is always present when the hose and the hose reinforcement are glued or welded together. Also when the hose and the hose reinforcement are injection-molded simultaneously or consecutively from different plastics (in this connection, rubber is considered a plastic) a direct adherent connection is assumed.

Preferably, the hose reinforcement has a fiber ply or a textile ply which is embedded in the hose material. Such a ply creates a sufficient mechanical stability for the hose in the sealing zone to reliably fasten the hose on the circumference of the pipe socket.

In an alternative or additional embodiment it can be provided that the hose reinforcement is formed by a bearing ring which encases the hose at least over part of the length of the sealing zone. The bearing ring is configured in consideration of two tasks. On the one hand, the bearing ring has to make sure that the hose is connected to the pipe socket with the necessary radial tension in order to produce the sealing effect. On the other hand, the bearing ring must be configured in such a way that fastening means can cooperate with the bearing ring and the pipe socket in order to prevent the hose from disengaging from the pipe socket.

The hose reinforcement preferably has a locking surface which proceeds essentially vertically to the center axis of the pipe socket and on which a locking element engages which produces a form-fitting connection between the hose reinforcement and the pipe socket. The locking element in this case is a kind of clamp which keeps the hose reinforcement, and thus the hose, and the pipe socket together in axial direction (with respect to the pipe socket). Depending on the embodiment, such a locking element can be mounted already on the hose reinforcement or on the pipe socket before connecting the hose and the pipe socket.

Preferably, the hose reinforcement is provided with a circumferentially running groove whose wall forms the locking surface. This is a particularly simple embodiment to produce a locking surface. Such a groove can be manufactured simultaneously with the production of the hose reinforcement, particularly if the hose reinforcement is formed by the bearing ring which can be injection-molded from a plastic material.

Preferably, the locking element is designed as an elastic ring. During assembly of the hose, the elastic ring spreads open on the pipe socket and then swings together wherein it form-fittingly overlaps an area of the hose reinforcement and an area of the pipe socket.

In a preferred embodiment it is provided that the hose has on its external side at least two radially projecting cams with gaps therebetween, wherein behind every cam is an opening and wherein the hose reinforcement has at least two inwardly projecting juts that fit through the openings and into the clearances. The hose and the hose connection can then be connected to each other in the manner of a bayonet catch. For that purpose, the hose reinforcement, for example the bearing ring, is pushed in axial direction onto the hose end in such a manner that the inwards projecting juts move through the gaps. As soon as the juts have been guided axially past the cam, the hose reinforcement can be adjusted against the hose. The juts then come to lie behind the cams in axial direction so that the hose reinforcement can no longer be axially pulled from the hose.

The hose reinforcement and/or the hose preferably have a snap-in pin which forms a pressure point that has to be surmounted during the adjustment of the hose reinforcement against the hose. The pressure point which needs to be surmounted during the fitting of the hose reinforcement onto the hose would also have to be surmounted when dismantling the hose reinforcement from the hose so that an unintended opening of the bayonet catch is practically impossible.

Advantageously, the combination of hose and hose reinforcement has on its end facing the pipe socket a conical expansion. This conical expansion makes it easier to plug the hose onto the pipe socket.

Preferably, the pipe socket has a circumferential projection which is beveled on its front side facing the hose. In particular, when an elastic ring is used for the axial connection between the pipe socket and the hose reinforcement, the beveled front side of the projection has the advantage that it forces the ring apart when sliding the hose onto the pipe socket. As soon as the ring with a radially inwardly projecting portion has surmounted the jut, it locks behind the jut so that the hose and the pipe socket are form-fittingly connected to each other.

Preferably, the jut has on its backside facing away from the hose a socket locking plane. The locking element can then hold onto this locking plain which proceeds either vertically to the axis or can be undercut.

Preferably, the pipe socket is provided with a boundary jut at a predetermined distance from the backside. In this manner it is easily guaranteed that the hose can be pushed onto the pipe socket only over a defined length so that the mounting geometry, in particular the length of the hose reinforcement can be adjusted relatively exactly to the sealing zone.

An advantageous embodiment provides that the hose reinforcement has several axially directed and radially elastic fastening fingers and an axially displaceable locking ring which, in a locking position, counteracts the deformation of the fastening fingers. In this case, the locking ring serves ultimately as hose reinforcement, wherein the locking ring acts through the fastening fingers onto the hose. Since the fastening fingers are radially elastic, they have to be separate from each other in a circumferential direction. Although in fact, as a consequence of this, the immediate support of the hose in circumferential direction is not consistent, it is nevertheless sufficient to seal the connection between the hose and the pipe socket. An expansion of the hose from inner pressure is reliably prevented through the locking ring. However, the embodiment has the particular advantage of a simple assembly. As long as the locking ring is not in the locking position, the fastening fingers can swing radially outward so that the assembly of hose and pipe socket can be executed relatively easy. When the hose is pushed onto the pipe socket, the fastening fingers swing radially outward and then hook themselves in behind a jut when hose and pipe socket have reached their end position relative to each other. When the locking ring is subsequently shifted into the locking position, further radial elastic movement of the fastening fingers is impossible. The hose is held on the pipe socket against expansion and the connection between the hose and the pipe socket is tight, so to speak.

The locking ring can preferably engage with at least one fastening finger in axial direction. This ensures that the locking ring cannot accidentally move from its locking position. An additional locking position can be provided in a release position in which the locking ring does not prevent a springing movement of the fastening fingers. This facilitates the assembly because during assembly the locking ring cannot accidentally move into the locking position.

Preferably, there is at least one supporting finger arranged between at least two fastening fingers. If the openings between the fastening fingers in circumferential direction grow too wide, support fingers can be provided in order to support the hose in circumferential direction radially outward with preferably possible openings.

An advantageous embodiment provides that the fastening fingers are mounted on the pipe socket. In this case the hose preferably has a circumferential groove into which the fastening fingers engage when the hose is mounted onto the pipe socket.

An alternative embodiment provides that the fastening fingers are mounted on a hose sleeve and are elastically engaged on the pipe socket. In this case, an additional element is necessary, namely, the hose sleeve which nevertheless can be connected to the hose without major problems, for example, by gluing or through a form-fitting connection.

A further possibility for an assembly of the hose and the pipe socket can be that the fastening geometry is provided in the form of a bayonet connection. In this case the pipe socket has at least two grooves on a circumferential plain which each form a section of a helical line. The hose reinforcement protrudes in axial direction radially over the hose and has inside on its axial ends an adequate number of juts which can then be inserted into these grooves. When the hose reinforcement is adjusted relative to the pipe socket, the hose is pushed onto the pipe socket in axial direction.

Preferably, the pipe socket has at its end which is pushed into the hose a diminution taper. This diminution taper can also be conically formed, wherein here the approach angle is also relatively small, preferably in the range of 1 to 10°. The conical diminution taper makes it easier to slide the hose onto the pipe socket without greatly interfering with the tightness.

Alternatively, or in addition, it can be provided that the hose at its end which is slid onto the pipe socket expands in the area of the sealing zone. This conical angle can also be relatively small, for example, in the area of 1 to 10°.

Preferably, the hose and/or the pipe socket have in the area of the sealing zone at least one swelling. When, for example, the hose has two radially inward projecting swellings at a predetermined axial distance from each other, these recreate two O-ring sealings which, however, are directly connected to the hose. The application of such swellings creates certain sections in the sealing zone where the hose and the pipe socket are adjoined at a greater surface pressure so that tightness is improved.

Alternatively or in addition it can be provided that in the sealing zone the hose has a sealing lip which cooperates with the pipe socket. This sealing lip can be, for example, directed radially inward. It is also possible to provide the sealing lip at the axial front face of the hose.

It can also be provided that the hose and the pipe socket have a front face and a circumferential contact component in the sealing zone. In this case, at the appearance of inner pressure, the hose is pressed outwardly against the respective sealing surface which lends additional security against permeability of the connection. The pipe socket and the hose can be provided in their area of contact with the same inner diameter in order to keep turbulence of a flowing medium at a minimum.

Herein it can be provided that he pipe socket has at its face end a circumferential groove in which the hose engages with a circumferential jut at its face end. If the geometry of the jut differs slightly from the geometry of the groove, the result is the deformation of the jut in the groove which results in an improved sealing action.

This is particularly true if the groove has with increasing depths a decreasing width. Width in this case refers to the radial extension of the groove. When the hose is pressed with the appropriate axial force against the pipe socket, the result is excellent tightness.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
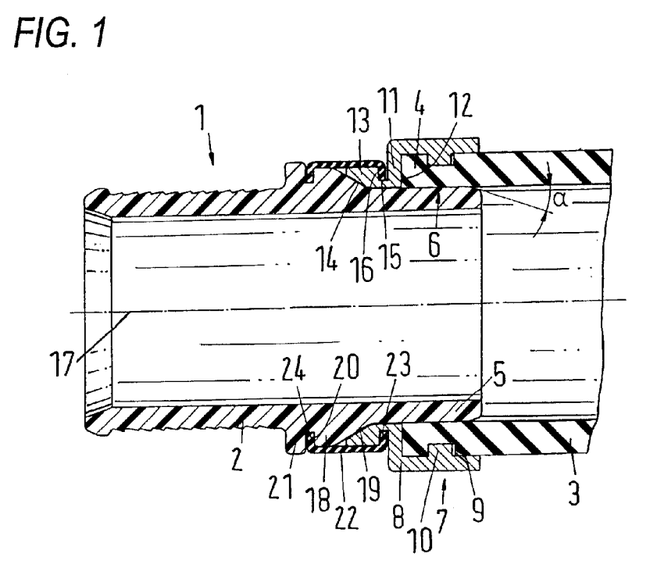
FIG. 1 shows a first embodiment of a connection arrangement.

An assembly arrangement 1 as illustrated in FIG. 1 serves to connect a pipe socket 2 with a hose 3 made of rubber-like material in such a way that between the pipe socket 2 and the hose 3 no further coupling elements are needed.

The pipe socket 2, for example, is made of plastic material, in particular a thermoplastic synthetic material. Preferably, the pipe socket 2 is made of polyamide (PA), polyester, PBT, PET, PBN, PEN, PPS, PPA, polypropylene (PP), polyethylene (PE), polyacetal (POM), PTFE, ETFE, PVDF. The pipe socket 2 can also be made of metal, for example, aluminum.

The hose 3 is made of a rubber-like material. This can be a natural rubber or also a synthetic rubber (EPDM, NBR, HNBR, silicone, MQV, FKM) or other fluoro elastomers. Thermoplastic elastomers, like TPE-O, TPE-V, TEEE can also be considered.

The hose 3 made of rubber-like material has the advantage that it is relatively flexible. However, in the event of inner pressures it usually expands slightly.

The hose 3 slides with its end 4 onto an end 5 of the pipe socket 2. Thereby, a sealing zone 6 is created in which the two ends 4, 5 of the pipe socket 2 and the hose 3 overlap.

A hose reinforcement 7 which is shaped in the embodiment of FIG. 1 as bearing ring 8 encases the hose 3 at least over the length of the sealing zone 6. It is noted here that the sealing zone 6 does not necessarily have to cover the entire area of overlapping between the ends 4, 5. The sealing in the sealing zone 6 is obtained by adjusting the inner diameter of the hose 3 to the outer diameter of the pipe socket 2.

The bearing ring 8 can also be made of a plastic material. However, it has a stronger deformation resistance than the hose 3. The heat expansion coefficient of the bearing ring 8 should match the heat expansion coefficient of the pipe socket 2. However, an exact concurrence is not necessary. It is sufficient if the heat expansion coefficient of the bearing ring 8 lies within 60% to 150% of the heat expansion coefficient of the pipe socket 2.

The bearing ring 8 prevents the hose 3 from expanding in the area of the sealing zone in case of a pressure increase inside the hose 3.

The bearing ring 8 is form-fittingly mounted on the radial circumference of the hose 3. For this purpose, the hose 3 is provided with a circumferential groove 9 into which protrudes a radially inward projecting circumferential jut 10 on the bearing ring. Instead of one circumferential jut one can also use several juts 10 that are arranged in circumferential direction at a distance toward each other. In this case it is also not necessary that the groove 9 is formed continuously in circumferential direction. In fact it is sufficient to have radial recesses in the circumferential wall of the hose 3 that match the juts 10.

In the area of the groove 9 the hose 3 has a slightly smaller wall thickness than in axial direction outside of groove 9. When the pipe socket 2 is pushed into the hose 3, the hose 3 slightly expands at its end 4. Since the hose 3 has in the area of the groove 9 a smaller wall thickness, this radial expansion results in a stronger compression of the hose material in the area of groove 9 than axially outside of it. This again results in a pressing of the hose 3 in the area of the sealing zone 6 so that the hose 3 can no longer be pulled past the radially inward projecting jut 10 of the bearing ring 8. Thus is prevented that the hose 3 can be disengaged from the pipe socket 2.

The bearing ring 8 has a leg 11 which extends radially inward and which covers a face end 12 of the hose 3. Adjacent to the leg 11 at its end facing the pipe socket 2 is attached a lengthening 13 with a conical expansion 14. The lengthening 13 has a circumferential groove 15 which terminates at the leg 11 at its end facing the hose 3. On the opposite side it forms a locking surface 16. This locking surface 16 is arranged essentially vertical to the axis 17 of the pipe socket 2. However, it can also be formed in an undercut manner.

The pipe socket 2 has a circumferential jut 18 which is conically slanted at its front side 19 facing the hose 3. The tip-of angle of the front side 19 corresponds essentially to the tip-of angle of the expansion 14. It is in the range of 30° to approx. 60°.

On its backside, the jut 18 has a stub holding surface 20.

In a predetermined small distance from the stub holding surface the pipe socket 2 has a boundary jut 21 which projects slightly in radial direction over the jut 18.

The circumferential wall of the pipe socket 2 in the area of the end 5 is conically tapered. For reasons of clarity, the appropriate cone angle α is entered in an exaggerated size. It has a magnitude of approx. 1 to 10°. Appropriately, the hose 3 can expand here at a small cone angle in the range of 1 to 10°. Conveniently, only one of the two elements of pipe socket 2 and hose 3 is expanded, in order to facilitate the sliding of the hose 3 onto the pipe socket 2, on the one hand, and not to interfere with the tightness, on the other hand.

An elastic ring 22 has two inwardly projecting legs 23, 24, wherein the leg 23 facing the hose 3 abuts at the locking surface 16 in the groove 15 and wherein the leg 24 facing the pipe socket 2 abuts at the stub holding surface 20 at the jut 18.

In order to establish the connecting arrangement, the hose 3 is equipped with the bearing ring 8. This can already be done during manufacturing of the hose 3.

Thereafter, the elastic ring 22 is inserted in the groove 15 with the leg 23.

Thereupon, the hose 3 can be pushed onto the pipe socket 2. The conical tapering of the end 5 of the pipe socket 2 can ease the sliding process.

During sliding of the hose 3 the leg 24 of the elastic ring 22 comes abut alongside the beveled front wall 19 of the jut 18 so that the elastic ring 22 is expanded. Since the elastic ring is generally expanded evenly in axial direction, the leg 11 serves to further push the elastic ring 22 with the bearing ring 8 in the direction of the boundary jut.

Approximately when the expansion 14 arrives alongside the front wall 19, the leg 24 engages in the groove built between the jut 18 and the boundary jut 21 so that the leg 24 engages behind the stub holding surface 20.

As soon as the elastic ring 22 engages with its two legs 23, 24 behind the locking surface 16 and the stub holding surface 20, the hose 3 is protected against axial disengagement from the pipe socket 2.

The hose 3 seals in the sealing zone 6 against the pipe socket 2. This seal remains even at the appearance of a higher pressure inside the hose 3 because the bearing ring 8 serves as hose reinforcement 7 and prevents an expansion of the hose 3 in the area of the sealing zone 6.

The bearing ring 8 can be made of a plastic material as well. However, it can also be made of metal.

Instead of an elastic ring 22 one can also use other means for the axial connection of the pipe socket 2 and the bearing ring 8 and thereby the hose 3.

The connecting device 1 is provided only with a single sealing zone 6 between the hose 3 and the pipe socket 2. No additional sealing elements are necessary that could get lost. This heightens the procedure safety. Furthermore, the connecting device 1 is designed as structurally short because it does not have to include a crossover piece between the hose 3 and the pipe socket 2.

Such a connecting device can be designed as a plug-in type solution. There is no need for either a hose clamp or a press sleeve or the like. Rather, it is sufficient to insert the end 4 of the hose 3 in the hose reinforcement 7. However, this is possible without further and without major effort as long as long as the hose 3 has not yet been pushed onto the pipe socket 2. Thus, for the execution of the connecting device only a linear movement of the pipe socket 2 into the hose 3 is necessary. For the disengagement of the connecting device 1 it might be necessary to expand the elastic ring 22. However, that too is possible with little effort.

FIGS. 2 to 14 show modified embodiments of the connecting device 1. Identical and analogous structural components as in FIG. 1 are provided with the same reference numerals.

Figure 2:
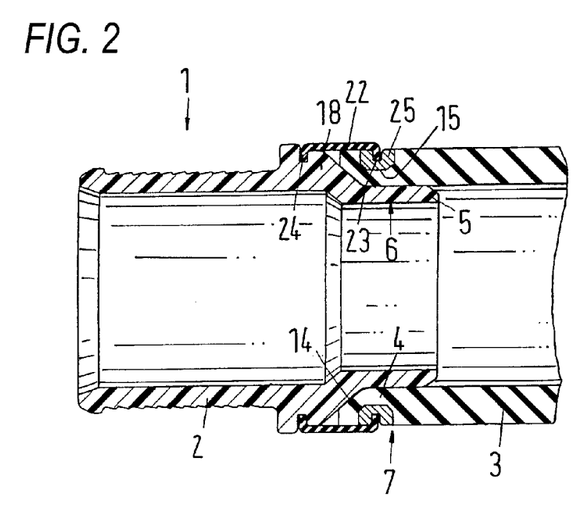
FIG. 2 shows a second embodiment of a connection arrangement.

The connecting device 1 according to FIG. 2 differs from the connecting device according to FIG. 1 in that the hose reinforcement 7 is now configured as inlay 25 which is inserted in the circumferential wall of the hose 3. As shown, this inlay can be configured as a discrete element. However, the inlay 25 can also be formed by reinforcing the hose 3 in the area of the hose reinforcement with fibers, fabrics or similar inlays to such a degree that it can no longer be expanded radially in the area of the sealing zone 6. The inlay 25 can also be injection-molded together with the hose 3 or it can be vulcanized inside.

In the embodiment of FIG. 2, the taper 14 is provided immediately on the inside of the hose 3.

The inlay 25 has a groove 15 in which the locking element configured as elastic ring 22 engages with its leg 23.

Figure 3:
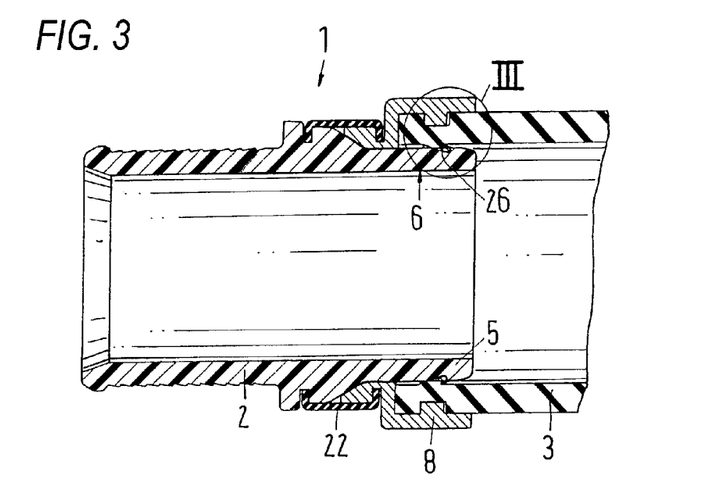
FIG. 3 shows a third embodiment of a connection arrangement.

In the embodiment of the connecting device 1 according to FIG. 3, the pipe socket 2 and the bearing ring 8 as well as the elastic ring 22 correspond to the embodiment according to FIG. 1. What is different is the configuration of the hose 3. The hose 3 has in the area of the sealing zone 6 a sealing lip 26 which rests against the end 5 of the pipe socket 2. The radial distance between the hose 3 and the end of the pipe socket 2 is illustrated here in an exaggerated size. Generally, this radial distance will only have the size of a fraction of a millimeter. The hose 3 has in the area of the sealing lip 26 a recess 26a into which the sealing lip 26 can be at least partially pressed when the hose 3 is slid onto the pipe socket 2. At the presence of pressure in the hose 3, the sealing lip 26 is pressed against the circumferential wall of the pipe socket 2.

Figures 3A, 4:
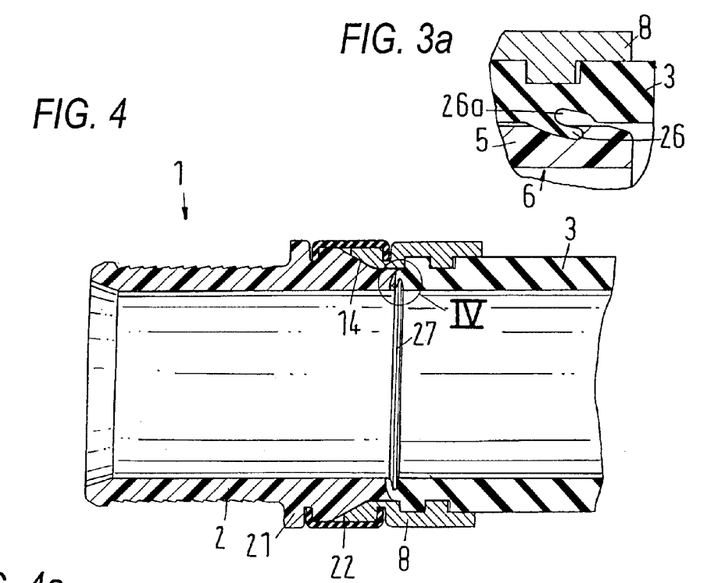
FIG. 3*a* shows an enlarged sectional view III according to FIG. 3.
FIG. 4 shows a fourth embodiment of a connection arrangement.
Figure 4A:
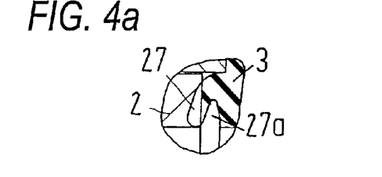
FIG. 4*a* shows an enlarged sectional view IV according to FIG. 4.

In the embodiment according to FIG. 4, the pipe socket 2 and the hose 3 are practically of identical inner diameter.

The hose 3 has on its front end a sealing lip 27 which rests against the front end of the pipe socket 2 facing the hose 3 when the hose 3 is mounted in the pipe socket with the help of the elastic ring 22 and the bearing ring 8. In this case, the hose 3 seals only at the front end of the pipe socket 2. The hose 3 has in the area of the sealing lip 27 at its face end a recess 27a into which the sealing lip 27 can be partially pressed when the hose 3 and the pipe socket 2 rest against each other frontally.

Since the hose 3 does no longer have to be arranged outside the pipe socket 2 in a radial direction, the bearing ring 8 can also have a reduced outer diameter. It has approximately the same outer diameter as the boundary jut 21 which, in its turn, has the same outer diameter as the elastic ring 22 in the illustrated assembled position.

Incidentally, however, the expansion 14 is configured on the bearing ring 8 in the same manner as in the embodiment according to FIG. 1.

Figure 5:
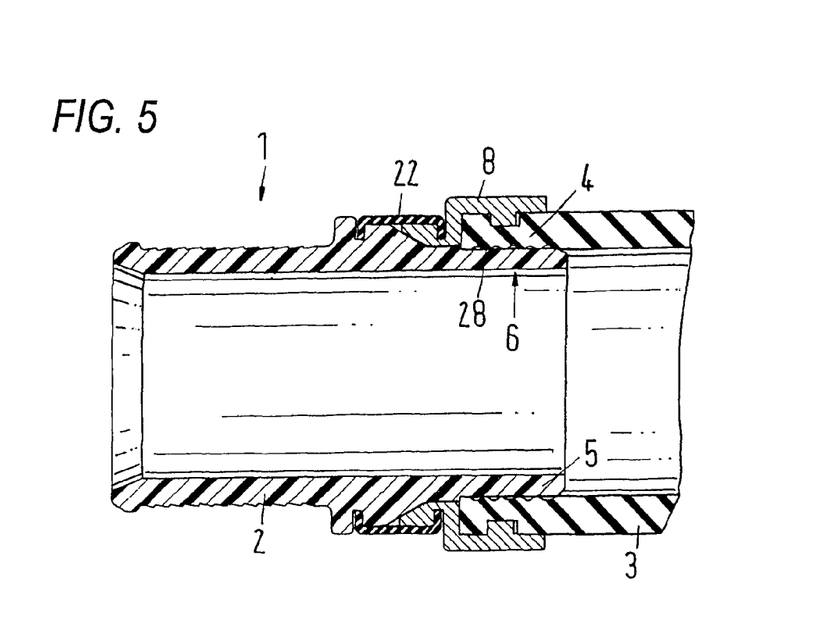
FIG. 5 shows a fifth embodiment of a connection arrangement.

FIG. 5 shows a further variation of a connecting device in which the hose 3 at its end 4, which together with the end 5 of the pipe socket 2 forms the sealing zone 6, has several inwardly projecting swellings 28. In the present embodiment, five such swellings 28 are provided. In general, however, two such swellings 28 are sufficient.

With five swellings 28 there are five singular sealing areas in the sealing zone 6 where the hose 3 rests with an increased surface pressure at the end 5 of the pipe socket 2. This results in excellent sealing properties.

Figure 6:
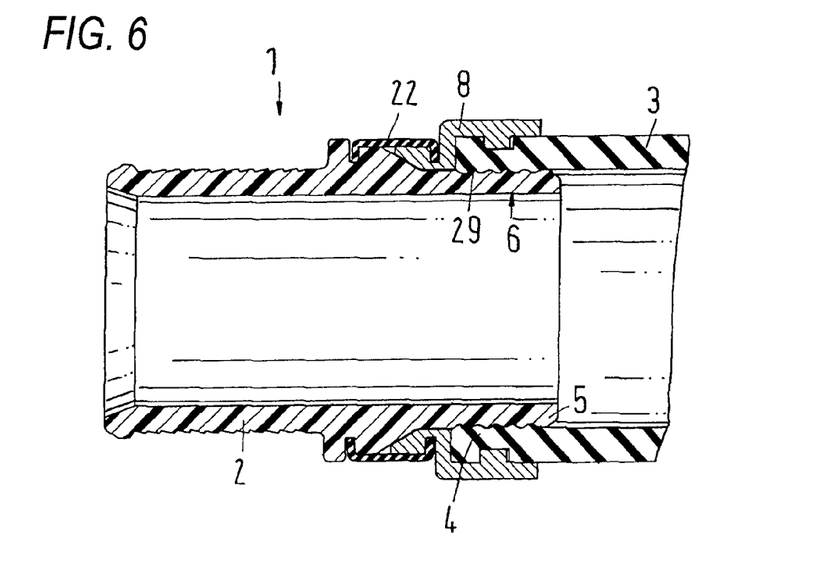
FIG. 6 shows a sixth embodiment of a connection arrangement.

In the embodiment according to FIG. 6, the pipe socket 2 has at its end 5 five circumferential juts 29 which press into the radial inner wall of the hose 3. This also results in an improved tightness because the sealing length is increased.

Finally, it is also possible to provide a configuration on the inside of the hose 3 in the area of its end 4 which is complementary to the configuration of the pipe socket 2 at its end 5, so that, for example, the swellings 29 as illustrated in FIG. 5 engage in "valleys" between individual juts 29 of FIG. 6.

Figure 7:
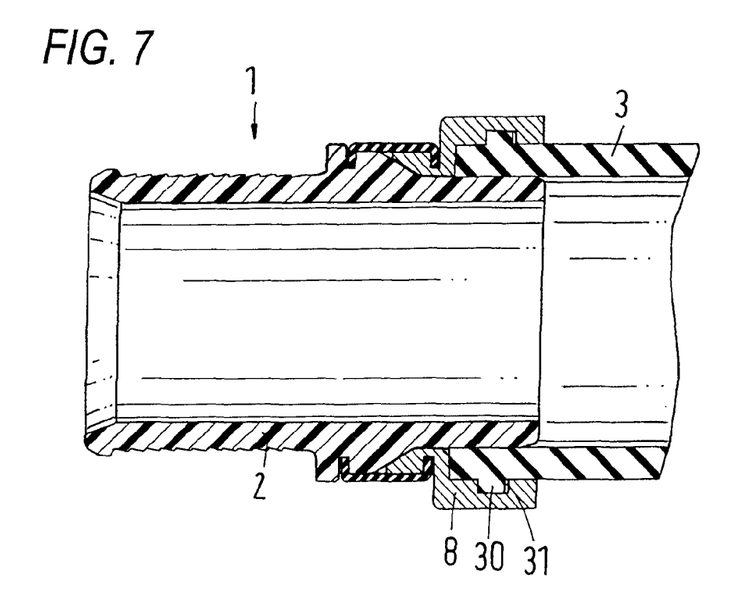
FIG. 7 shows a seventh embodiment of a connection arrangement.

FIG. 7 shows a compared to FIG. 1 modified embodiment of a connecting device.

While in FIG. 1 on the bearing ring 8 a radially inward directed jut 10 is provided which engages in a groove 9 on the hose 3, in the embodiment according to FIG. 7 the hose 3 has a radially outwardly directed jut 30 which engages in a groove 31 on the bearing ring. Like in the embodiment according to FIG. 1, jut 30 and groove 31 can also be configured continuously in circumferential direction. However, they can also be interrupted, wherein the jut 30 as well as the groove 31 must have mutually adjusted positions and lengths in a circumferential direction.

Figure 8:
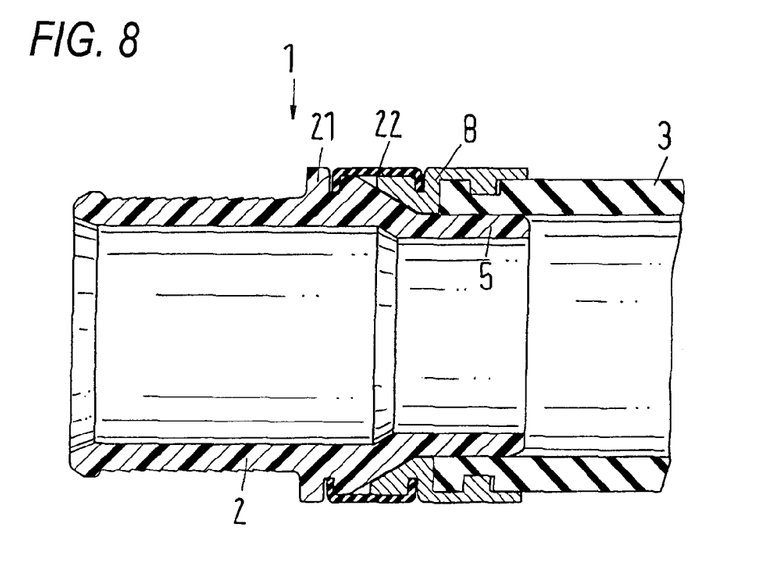
FIG. 8 shows an eighth embodiment of a connection arrangement.

FIG. 8 shows an embodiment according to FIG. 1, in which the pipe socket 2 in the area of its end 5 has a reduced outer diameter and a reduced inner diameter. In this case, as in the embodiment according to FIG. 4, the bearing ring 8 can have a reduced outer diameter so that the outer diameter of the bearing ring 8 does not exceed the outer diameter of the boundary jut 21 and the outer diameter of the elastic spring 22.

Figure 9:
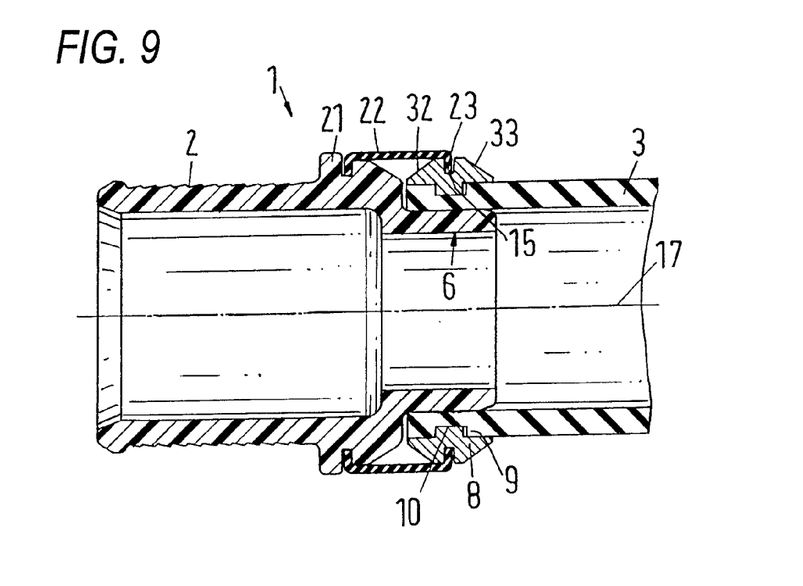
FIG. 9 shows a ninth embodiment of a connection arrangement.

FIG. 9 shows an embodiment of a connecting device 1, wherein the form of the bearing ring 8 is altered. The bearing 8 has on its side facing the pipe socket 2 a beveled flank 32 and on its opposite side a beveled flank 33. Relative to a plain which stands vertically on the axis 17 of the pipe socket 2 the bearing ring is thus configured symmetrically. The groove 15 which receives the leg 23 of the elastic ring 22 is located approximately in the axial center of the bearing ring 8.

The pipe socket 2 has in the area of the sealing zone 6 a reduced outer diameter so that the elastic ring 22 has the same outer diameter as the boundary jut 21.

Figure 10:
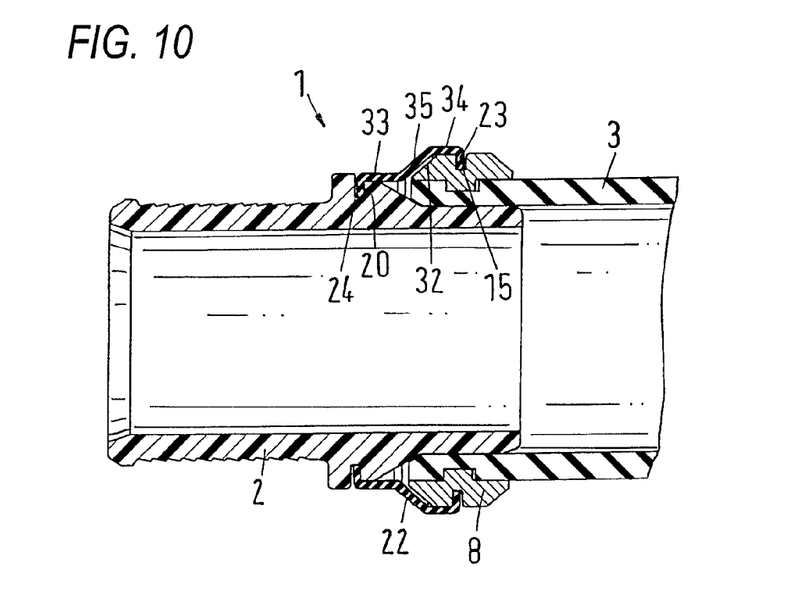
FIG. 10 shows a tenth embodiment of a connection arrangement.
Figure 11:
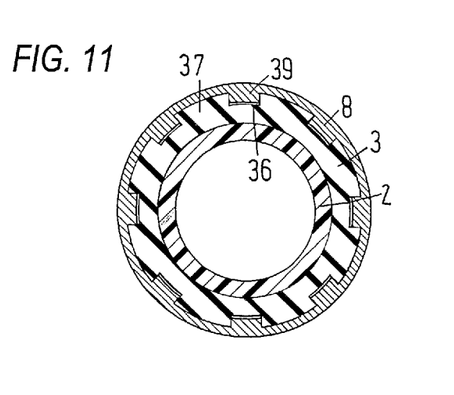
FIG. 11 shows a section along line XI-XI according to FIG. 12.
Figure 12:
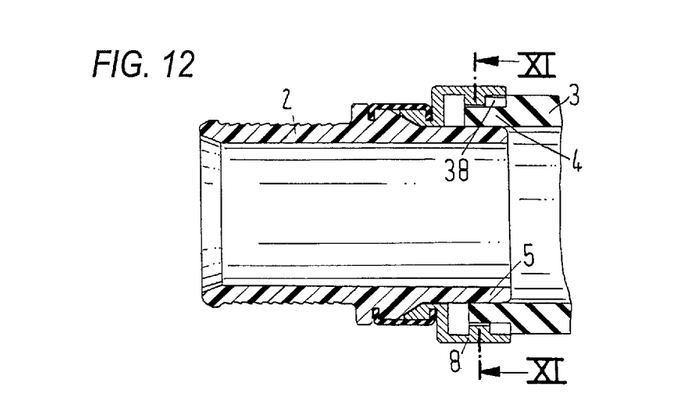
FIG. 12 shows an eleventh embodiment of a connection arrangement in a first position.
Figure 13:
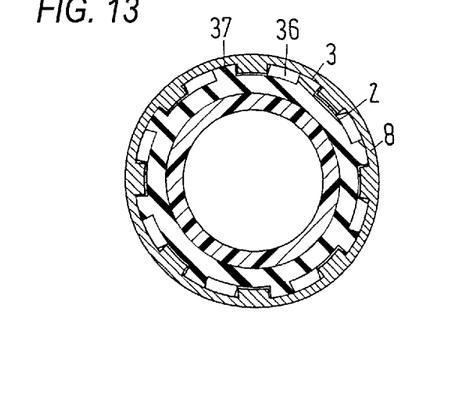
FIG. 13 shows a section along line XIII-XIII according to FIG. 14.
Figure 14:
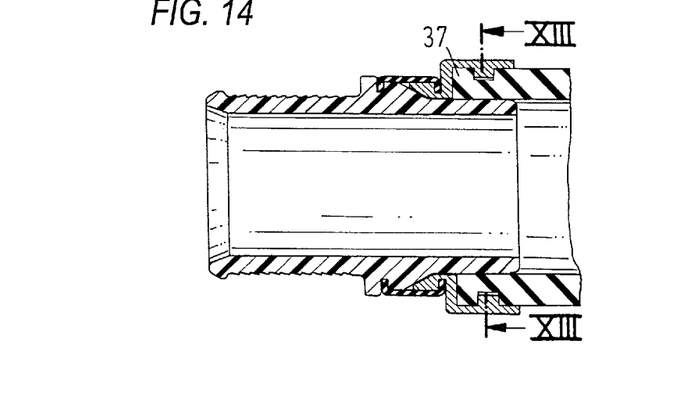
FIG. 14 shows the embodiment according to FIG. 12 in a second position.

In the embodiment of the connecting device 1 according to FIG. 10, the pipe socket 2 has again a constant inner diameter so that the hose 3 which is slid onto the pipe socket 2 has an accordingly larger outer diameter. The shape of the bearing ring 8 corresponds essentially to the shape of the bearing ring from FIG. 9.

What has changed is the shape of the elastic ring 22. The elastic ring 22 still has two radially inwardly directed legs 23, 24, wherein the leg 23 engages in the groove 15 on the bearing ring 8 and the leg 24 engages behind the stub holding surface 20.

The elastic ring 22, however, is of stepped configuration, wherein between two essentially axially parallel sections 33, 34 a crossover section 35 is provided. With this embodiment it is possible to keep the crossover section close to the edge 32 of the bearing ring 8 so that greater free spring movements of the elastic ring 22 can be avoided.

In the embodiment according to FIGS. 11 to 14, the bearing ring 8 is connected releasable with the hose 3.

The hose 3 has in the area of its end 4 several axially parallel grooves 36.

Between the grooves 36 are provided radially outward projecting pins 37. On the side of the pins 37 facing away from the pipe socket 2 an in circumferential direction running respective clearance 38 is provided.

The bearing ring 8 has radially inwardly directed juts 39 whose extension in circumferential direction is somewhat smaller than the extension of the grooves 36 in circumferential direction. The axial length of the juts 39 is somewhat smaller than the axial length of the clearance 38.

As a start, one can assemble the hose 3 and the jut 39 in an axial direction by pushing the juts 39 into the grooves 6. As soon as the juts 39 have reached the clearances 38, the hose 3 can be turned against the bearing ring (or vice versa) so that the hose 3 and the bearing ring 8 are locked against each other in the manner of a bayonet catch.

In a manner not further illustrated, it can be provided that the jut 39 has to surmount a small swelling during fastening into the clearing 38. In the same manner, when disengaging from the clearing, the jut 39 must surmount this swelling so that an accidental sudden opening of the bayonet catch is practically impossible.

FIGS. 15 to 20 illustrate a twelfth embodiment of a connecting device in which same parts are identified with the same reference numerals as previously used.

Figure 15:
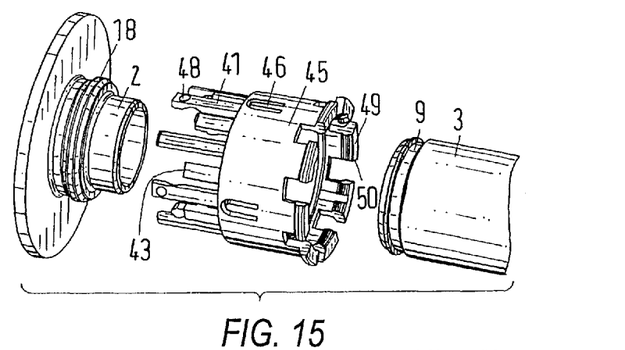
FIG. 15 shows a twelfth embodiment of a connection arrangement in an enlarged illustration.

A hose sleeve 40 is added which several in the direction of the pipe socket 2 directed fastening fingers 41. The fastening fingers 41 have on their radial inside a convexity 42 which is adjusted to the shape of the jut 18 on the pipe socket. The individual fastening fingers 41 have in circumferential direction a certain distance to each other so that they can each individually spring radially outward. In this manner it is possible that the hose sleeve 40 can be slid onto the pipe socket, wherein, as illustrated in FIG. 17, the fastening fingers 41 engage at the jut 18.

Figure 16:
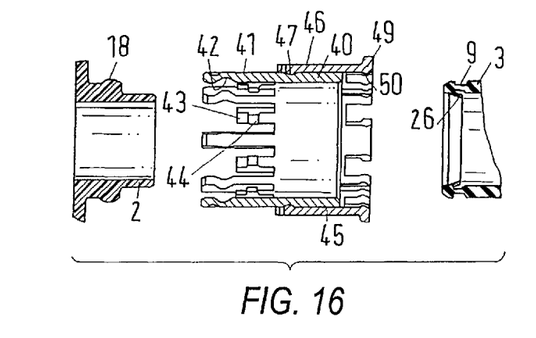
FIG. 16 shows a sectional view of the embodiment according to FIG. 15.

Between respectively two fastening fingers 41 support fingers 43 are provided which each have on their radial inner side a jut 44 that engages in the groove 9 on the hose 3. The support fingers 43 can also swing somewhat so that the juts 44 can be brought into engagement with the groove 9 on the hose 3.

Figure 17:
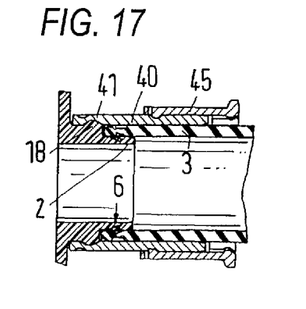
FIG. 17 shows the embodiment according to FIG. 15 in an assembled but not locked status.
Figure 18:
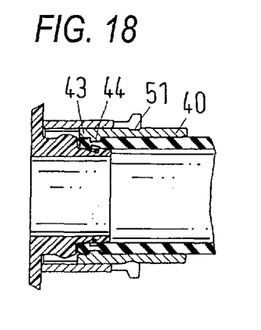
FIG. 18 shows the embodiment according to FIG. 15 along sectional line XVIII-XVIII according to FIG. 20.
Figure 19:
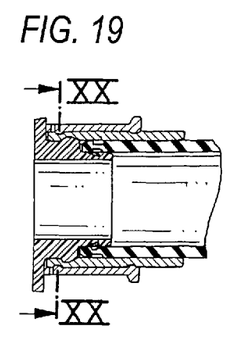
FIG. 19 shows the embodiment according to FIG. 17 along sectional line XIX-XIX according to FIG. 20.
Figure 20:
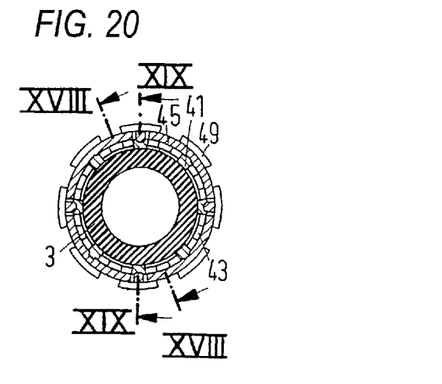
FIG. 20 shows a section along line XX-XX according to FIG. 19.

The hose sleeve 40 has a locking ring 45 which can be displaced in an axial direction relative to the hose sleeve 40, i.e., from a detached position as illustrated in FIGS. 15 to 17 into a locking position as illustrated in FIGS. 18 and 19. The locking ring 45 has elastic tongues 46 that support a stop jut 47 which in the locking position and with respective recesses 48 comes into engagement on the fastening fingers 41. As soon as the locking ring has snapped into the locking position, a displacement of the locking ring 45 against the hose sleeve 40 is only possible with the application of external force. An accidental displacement is practically impossible.

The locking ring 45 has on the end facing away from the pipe socket 2 several elastic plates 49 which are each provided with a radially inward directed swelling 50. In a locking position, the swelling 50 engages in a circumferential groove 51 in the hose sleeve 40 to thus further strengthen the snap-fit.

In a first step of the assembly the hose sleeve 40 is slid onto the hose in such a manner that the juts 44 engage at the support fingers 43 in the groove. The hose sleeve 40 is thus provisionally mounted on the hose 3. The locking ring 45 is then in the unlocked position as illustrated in FIGS. 15 to 17.

As illustrated in FIG. 17, the hose sleeve 40 which is connected to the hose 3 is then slid onto the pipe socket 2 in such a manner that the fastening fingers 41 engage with the jut 18 on the pipe socket 2. Simultaneously, the hose 3 is slid externally onto the pipe socket 2 and thus creates the sealing zone 6.

In a further connecting step, the locking ring 45 is displaced against the hose sleeve 40 in the direction of the pipe socket 2 until the stop juts 47 engage in the recesses 48. Simultaneously, the swellings 50 engage in the groove 51 on the outside of the hose sleeve 40 so that the locking ring 45 can be moved in the opposite direction only under mobilization of certain force.

The locking ring 45 now prevents a radial spring movement of the fastening fingers 41 so that the hose sleeve 40 can no longer be disengaged from the pipe socket 2. Simultaneously, the locking ring 45 also prevents that the support fingers 43 swing outwardly and that the juts 44 can disengage from the groove 9 of the hose 3.

Furthermore, through the cooperation between the fastening fingers 41 and the support fingers 43 which abut externally on the hose 3 in the sealing zone 6 the locking ring 45 prevents the hose 3 from expanding in the sealing zone 6. The hose sleeve 40, or more accurately the fastening fingers 41 and the support fingers 43 together with the locking ring 45 consequently form the hose reinforcement.

Figure 21:
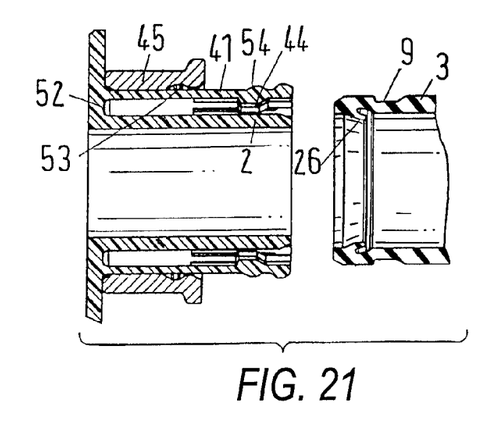
FIG. 21 shows a thirteenth embodiment of a connection arrangement in a separated status.
Figure 22:
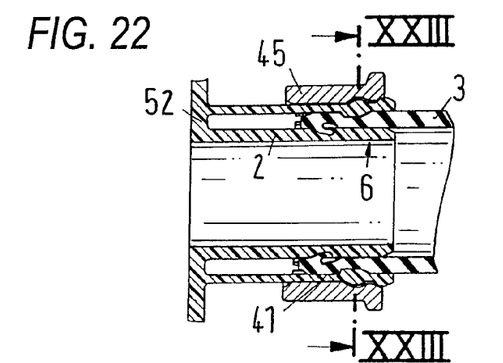
FIG. 22 shows the embodiment according to FIG. 21 in an assembled status.
Figure 23:
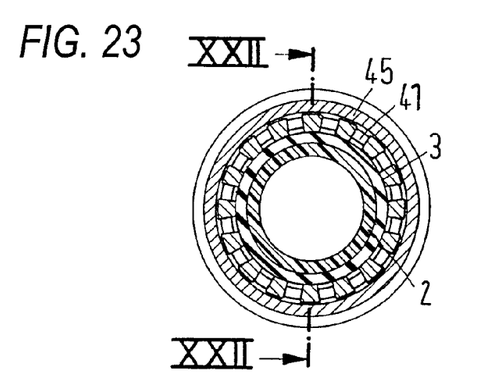
FIG. 23 shows a section along line XXIII-XXIII according to FIG. 22.
Figure 24:
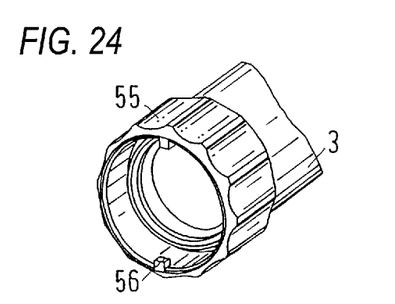
FIG. 24 shows a face end view of a hose in perspective illustration.
Figure 25:
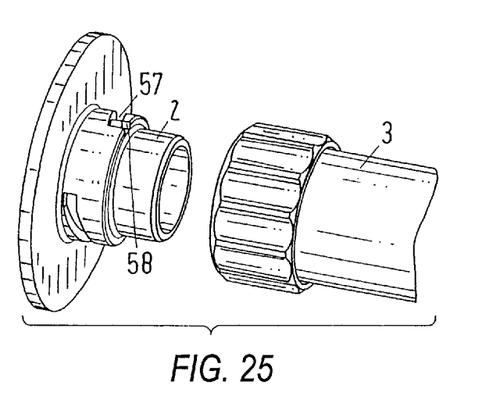
FIG. 25 shows a fourteenth embodiment of a connection arrangement in an enlarged perspective illustration with the hose according to FIG. 24.
Figure 26:
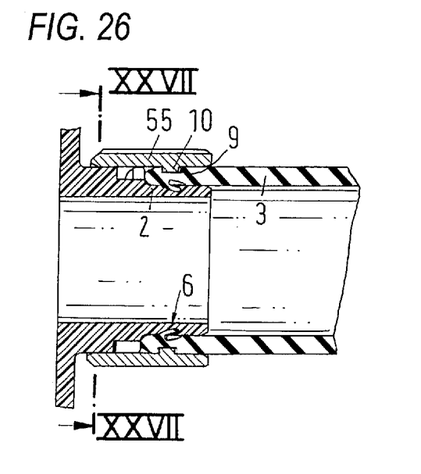
FIG. 26 shows a view of the embodiment according to FIG. 25 in a connected status along section XXVI-XXVI according to FIG. 27.
Figure 27:
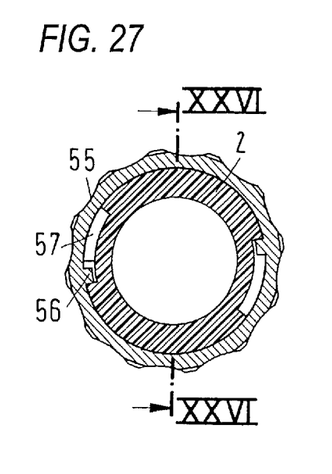
FIG. 27 shows a sectional illustration along the line XXVII-XXVII from FIG. 26.

FIGS. 21 to 23 show a similar embodiment, wherein same and corresponding elements are designated with the same reference numerals as in FIGS. 15 to 20.

In this case, the fastening fingers 41 are mounted on the pipe socket 2, namely above a base 52 from which the fastening fingers 41 are elastically suspended so that they can move elastically radially outward on the end facing away from the basis 52.

In this embodiment, the juts 44 are arranged on the fastening fingers 41. When, as shown in FIG. 22, the hose 3 is pushed onto the pipe socket 2, the juts 44 engage in the groove 9 on the hose 3. As soon as the hose 3 is pushed far enough onto the pipe socket 2, the fastening fingers 41 spring back so that the hose 3 is locked on the pipe socket 2.

In order to prevent radial rebounding of the fastening fingers 41, the locking ring 45 is adjusted away from the basis 52, as shown in FIG. 22. The locking ring 45 has on its radial inside a dent 53 in which a jut 54 on the radial outer wall of the fastening fingers 41 engages when the locking ring 45 has reached its locking position (FIG. 22). The locking ring 45 is kept in place there by the locking effect. The hose 3 can be compressed slightly for locking.

In this embodiment, the locking ring 45 together with the fastening fingers 41 also forms a hose reinforcement which prevents the hose 3 from expanding under pressure and thus ensures that the sealing arrangement remains tight.

FIGS. 24 to 27 show a modified fastening geometry. Same and corresponding elements are designated with the same reference numerals as in the previous Figures.

The hose 3 is equipped with a sort of coupling nut 55 which extends radially over the hose 3 and which has on its inner wall radially inwardly projecting pins 56.

The pipe socket 2 has a corresponding number of grooves 57 which are guided helically and which are provided with an axially directed opening 58.

When the pins 56 are axially inserted into the opening 58 and the coupling nut 55 is screwed up against the pipe socket 2, the hose 3 is pulled onto the pipe socket 2 in axial direction. The coupling nut 55 then forms the hose reinforcement which engages with a radially inwardly projecting jut 10 into the groove 9 on the circumference of the hose 3.

The coupling nut 55 can be fitted pivotably on the hose 3 so that only an axial movement of the hose 3 on the pipe socket 2 is necessary when the coupling nut 55 is screwed up against the pipe socket 2. A torque proof connection between the coupling nut 55 and the hose 3 can also be provided so that the hose 3 is slightly screwed up against the pipe socket 2 when it is pushed onto the pipe socket 2.

Figure 28:
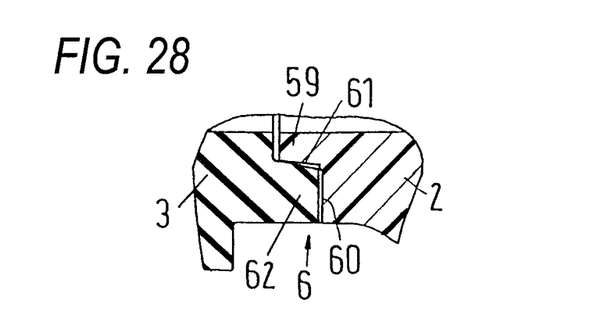
FIG. 28 shows a further embodiment of a sealing zone.
Figure 29:
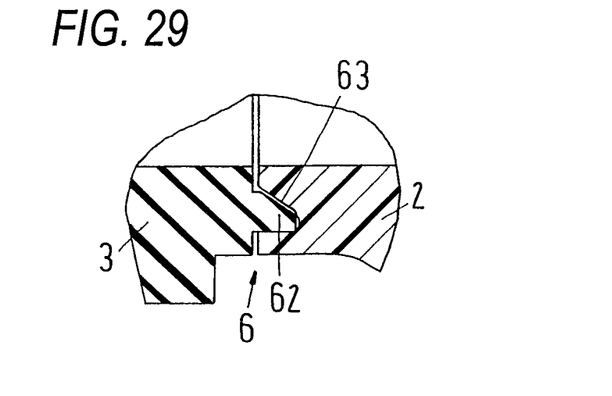
FIG. 29 shows a modified embodiment of a sealing zone.
Figure 30:
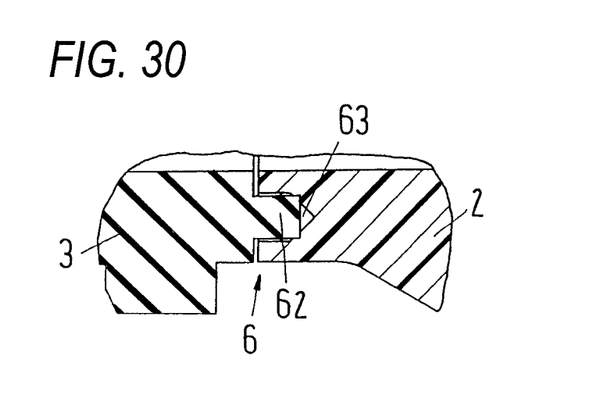
FIG. 30 shows is a further modified embodiment of a sealing zone.

FIGS. 28 to 30 show possible designs of a connection between the hose 3 and the pipe socket 2 when the hose 3 and the pipe socket 2 have the same outer diameter and possibly the same inner diameter, at least in the sealing zone 6.

FIG. 28 shows an embodiment where the hose 3 abuts radially on the inside on a circumferential jut 59 of the pipe socket 2 and simultaneously also on a front wall 60 of the pipe socket 2, wherein the jut 59 has an inner wall expanding conically toward the hose 3 so that the hose 3 is slightly compressed with a jut 62 attached to the pipe socket 2 when axially adjusted in direction of the pipe socket 2.

In the embodiment according to FIG. 29, the jut 62 of the hose 3 is inserted in a frontal groove 63 of the pipe socket 2 and there compressed in the end position so that again a sufficient tightness is produced. The groove 63 has a triangular cross section, i.e., with increased depth it features a diminished width, i.e., a reduced extension in radial direction.

FIG. 30 shows a modified embodiment. The jut 62 is of an approximately rectangular cross section, while the groove 63 is only of triangular cross section at the groove bottom. This also results in an excellent tightness, when the hose 3 is guided sufficiently close toward the pipe socket 2.

While specific embodiments of the invention have been shown and described in detail to illustrate the inventive principles, it will be understood that the invention may be embodied otherwise without departing from such principles.

The invention claimed is:

1. A connecting device comprising a pipe nipple and a hose made of an elastic material and having a pre-existing recess on a circumference of the hose, wherein the hose rests against the pipe nipple in a sealing zone which at least over a part of a length thereof is surrounded by a hose reinforcement that forms part of a geometric positive-locking configuration for holding the pipe nipple and the hose together, wherein the hose reinforcement is connected with the hose in a positive-locking manner that does not rely only on friction, wherein the hose reinforcement engages in the sealing zone in the pre-existing recess on the circumference of the hose, and further comprising an elastic ring that engages in a grove in the pipe nipple and a groove in the hose reinforcement so as to hold the hose and the pipe nipple together in an axial direction, wherein the hose reinforcement has a stronger deformation resistance than the hose.

2. The connecting device according to claim 1, wherein the hose reinforcement has a heat expansion coefficient which is about 60% to 150% of the heat expansion coefficient of the pipe nipple.

3. The connecting device according to claim 1, wherein the hose reinforcement is directly, adherently connected with the hose.

4. The connecting device according to claim 1, wherein the hose reinforcement has a fiber inlay or a textile inlay which is embedded in the material of the hose.

5. The connecting device according to claim 1, wherein the hose reinforcement is formed by a bearing ring which encases the hose at least over a length of the sealing zone.

6. The connecting device according to claim 5, wherein the hose reinforcement has a locking surface which proceeds essentially vertically to the center axis of the pipe nipple on which a locking element engages for producing a form-fitting connection between the hose reinforcement and the pipe nipple.

7. The connecting device according to claim 6, wherein the hose reinforcement has a circumferentially extending groove, wherein a wall of the groove forms the locking surface.

8. The connecting device according to claim 6, wherein the locking surface is comprised of an elastic ring.

9. The connecting device according to claim 1, wherein the combination of hose and hose reinforcement provide at its end facing the pipe nipple a conical expansion.

10. The connecting device according to claim 1, wherein the pipe nipple has a circumferential projection which is beveled at its front end facing the hose.

11. The connecting device according to claim 1, wherein the projection has on its backside facing away from the hose a socket locking plane.

12. The connecting device according to claim 11, wherein the pipe socket has a boundary jut at a predetermined distance from the backside.

13. A connecting device according to claim 1, wherein the pipe nipple has a diminution taper at the end thereof which is plugged into the hose.

14. The connecting device according to claim 1, wherein the hose expands in the area of the sealing zone at its end pushed onto the pipe socket.

15. The connecting device according to claim 1, wherein the hose has in the sealing zone a sealing lip which cooperates with the pipe socket.

16. A connecting device, comprising: a pipe nipple; and, a hose made of an elastic material and having a pre-existing recess on a circumference of the hose, wherein the pipe nipple and the hose abut each other in a sealing zone which at least over a part of a length thereof surrounded by a hose reinforcement that forms part of a geometric positive-locking configuration for holding the pipe nipple and the hose together, wherein the pipe nipple and the hose are connectable by a simple movement in which the pipe nipple is inserted into the hose, wherein the hose reinforcement is connected with the hose in a positive-locking manner that does not rely only on friction, wherein the hose reinforcement engages in the sealing zone in the pre-existing recess on the circumference of the hose, wherein the hose reinforcement has a stronger deformation resistance than the hose.

* * * * *